United States Patent
Meyers et al.

(10) Patent No.: US 7,298,251 B2
(45) Date of Patent: Nov. 20, 2007

(54) HAND HELD RFID READER WITH DIPOLE ANTENNA

(75) Inventors: David W. Meyers, Brooklyn Park, MN (US); Douglas R. Carlson, Woodbury, MN (US); Robert C. Becker, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 183 days.

(21) Appl. No.: 11/031,693

(22) Filed: Jan. 7, 2005

(65) Prior Publication Data

US 2006/0164251 A1 Jul. 27, 2006

(51) Int. Cl.
*G08B 26/00* (2006.01)
(52) U.S. Cl. ............ 340/505; 340/572.7; 343/793
(58) Field of Classification Search ............ 340/572.7, 340/505, 10.1, 10.52, 825.69; 343/793, 830; 235/492, 450, 472.1
See application file for complete search history.

(56) References Cited

U.S. PATENT DOCUMENTS

| | | | |
|---|---|---|---|
| 6,045,652 A * | 4/2000 | Tuttle et al. ............... | 156/292 |
| 6,459,412 B1 | 10/2002 | Koyanagi et al. | |
| 6,664,897 B2 * | 12/2003 | Pape et al. ............... | 340/573.3 |
| 2003/0174099 A1 * | 9/2003 | Bauer et al. ............... | 343/893 |
| 2005/0156040 A1 * | 7/2005 | Young et al. ............... | 235/439 |
| 2005/0200453 A1 * | 9/2005 | Turner et al. ............... | 340/5.61 |
| 2006/0135183 A1 * | 6/2006 | Zavada et al. ............... | 455/457 |

FOREIGN PATENT DOCUMENTS

| | | |
|---|---|---|
| EP | 1 475 858 | 11/2004 |
| GB | 2358991 | 8/2001 |
| WO | WO-00/46873 | 8/2000 |
| WO | WO-01/06401 | 1/2001 |

* cited by examiner

*Primary Examiner*—Phung T. Nguyen
(74) *Attorney, Agent, or Firm*—Fogg & Powers LLC

(57) ABSTRACT

A hand held Radio Frequency Identification (RFID) reader is provided. The reader includes a housing having a perimeter around an inner edge. The reader also includes a full-sized dipole antenna including two antenna elements coupled by a balun transformer. The antenna has nearly a unity gain over a range of angles. The reader also includes a transceiver, coupled to the dipole antenna by a suitable cable, the transceiver adapted to send and receive signals. The reader further includes a processor for processing signals received at the antenna. The first and the second antenna segments of the dipole antenna are wrapped along the perimeter around the inner edge of the housing.

16 Claims, 7 Drawing Sheets

An embodiment of a dipole antenna inside a handheld RFID reader

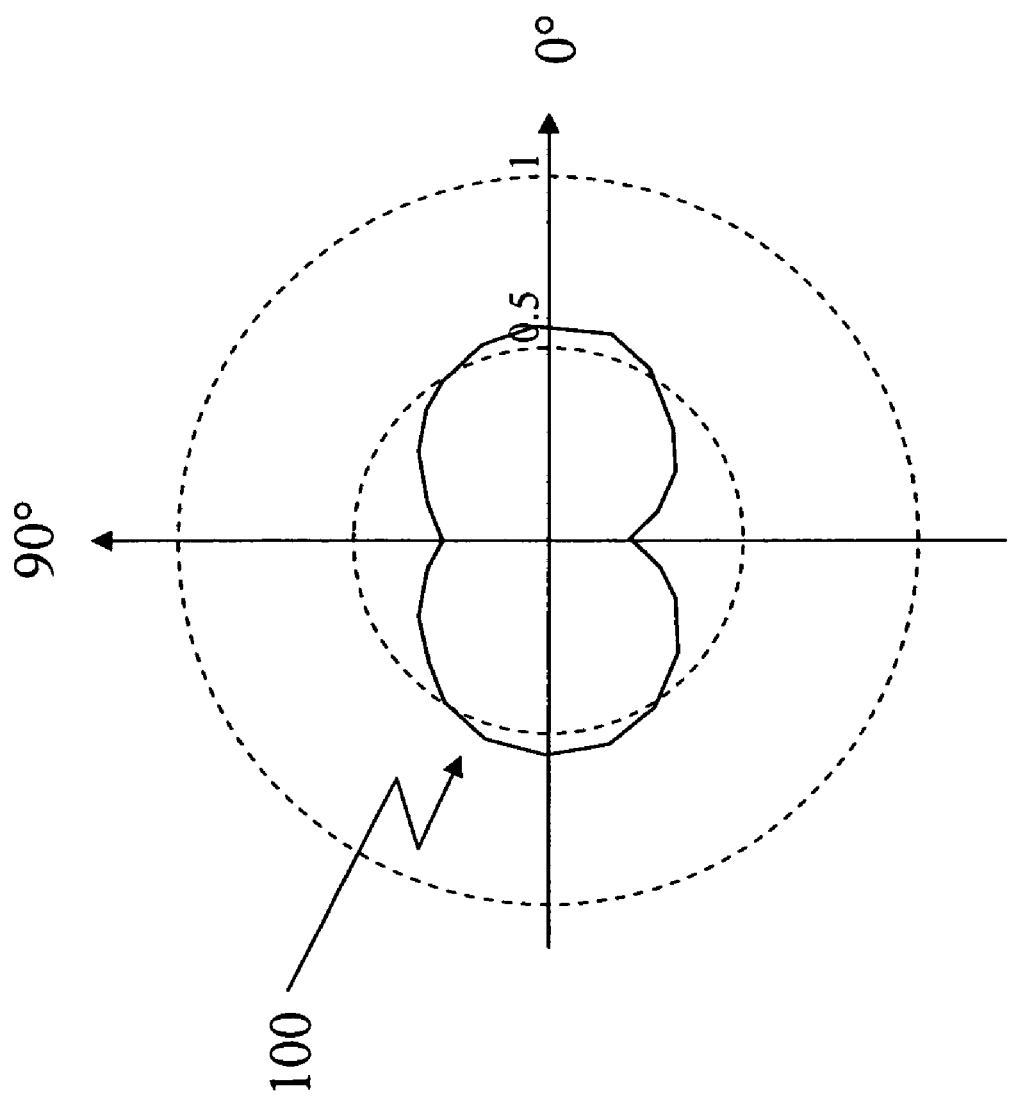
Fig. 1 Gain pattern for a compact antenna.

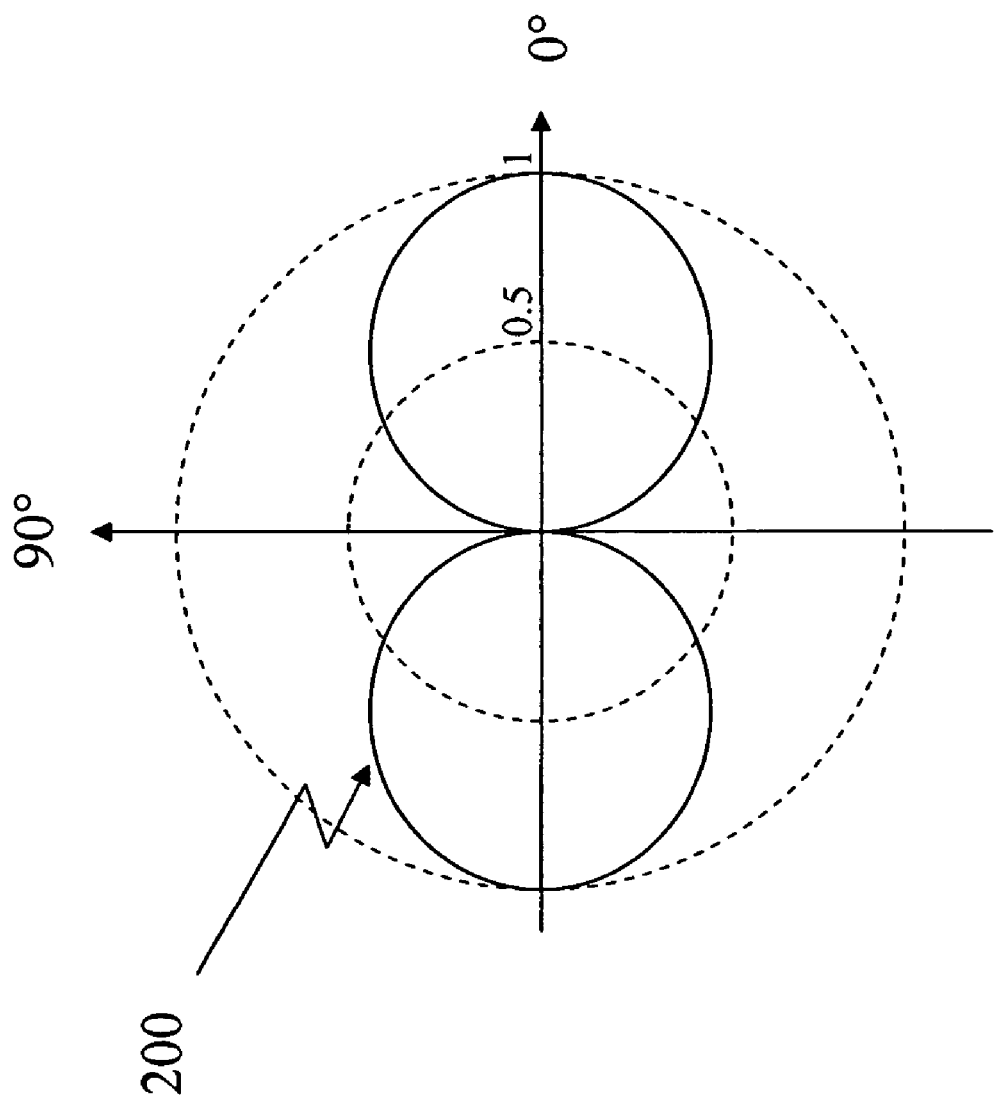
Fig. 2 Gain pattern for a full sized dipole antenna.

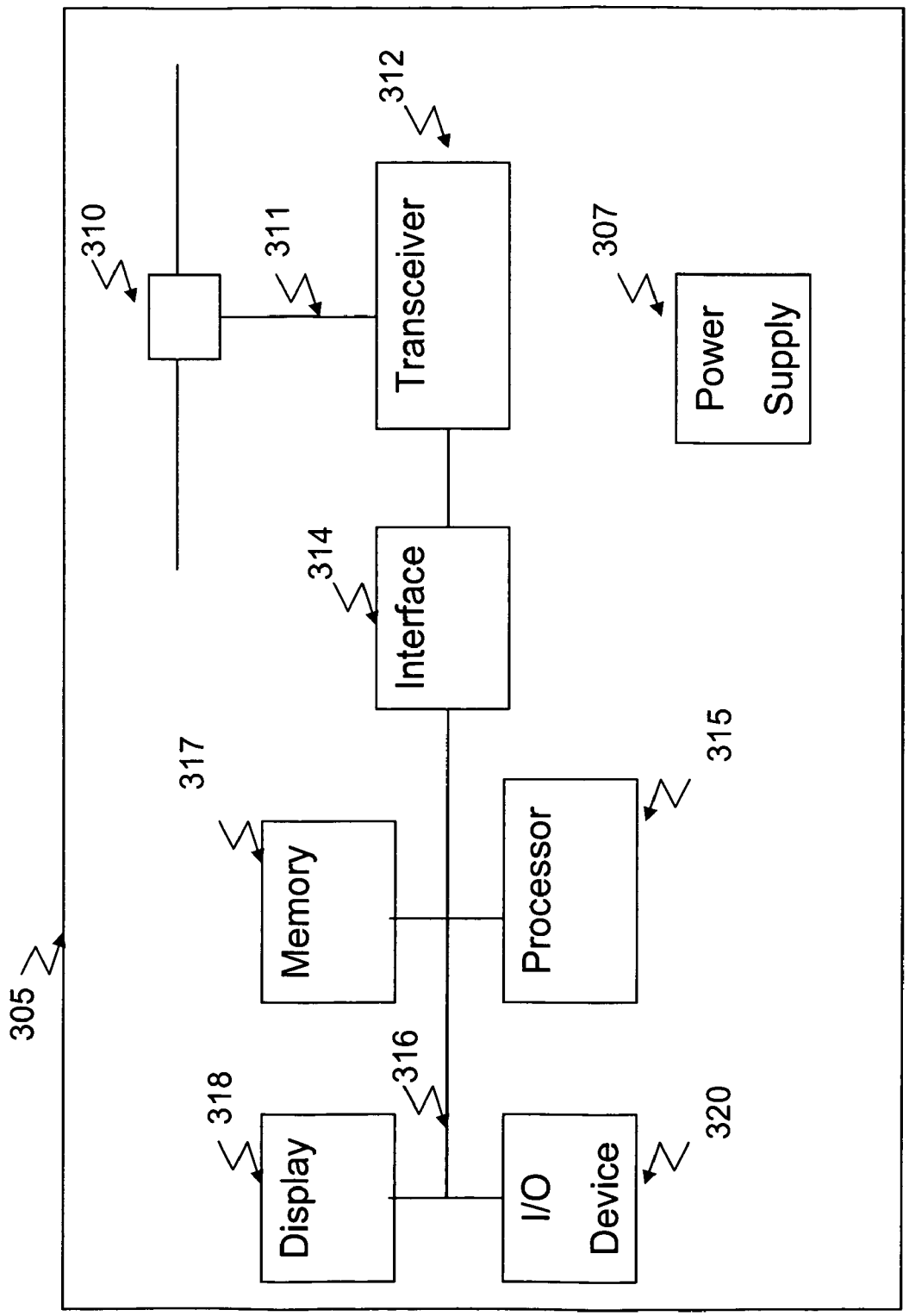
Fig. 3 An embodiment of an RFID reader

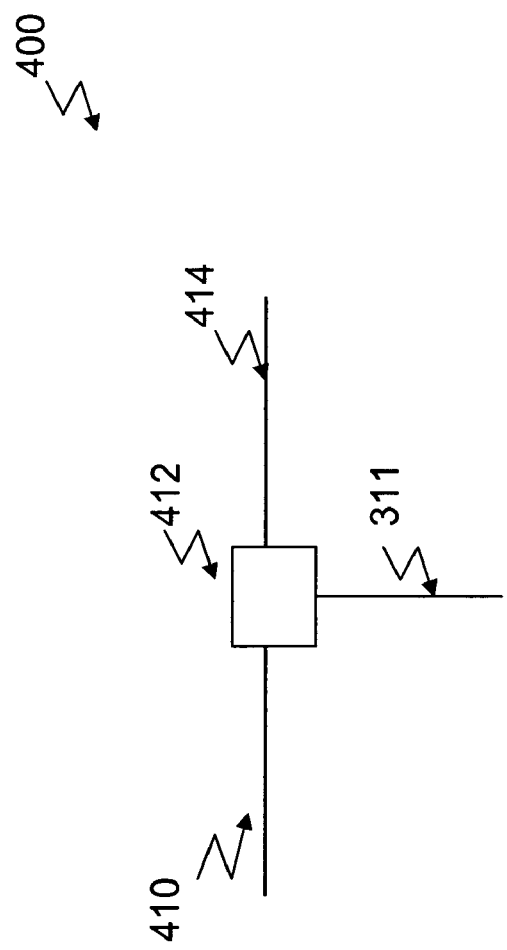
Fig. 4 An embodiment of a dipole antenna

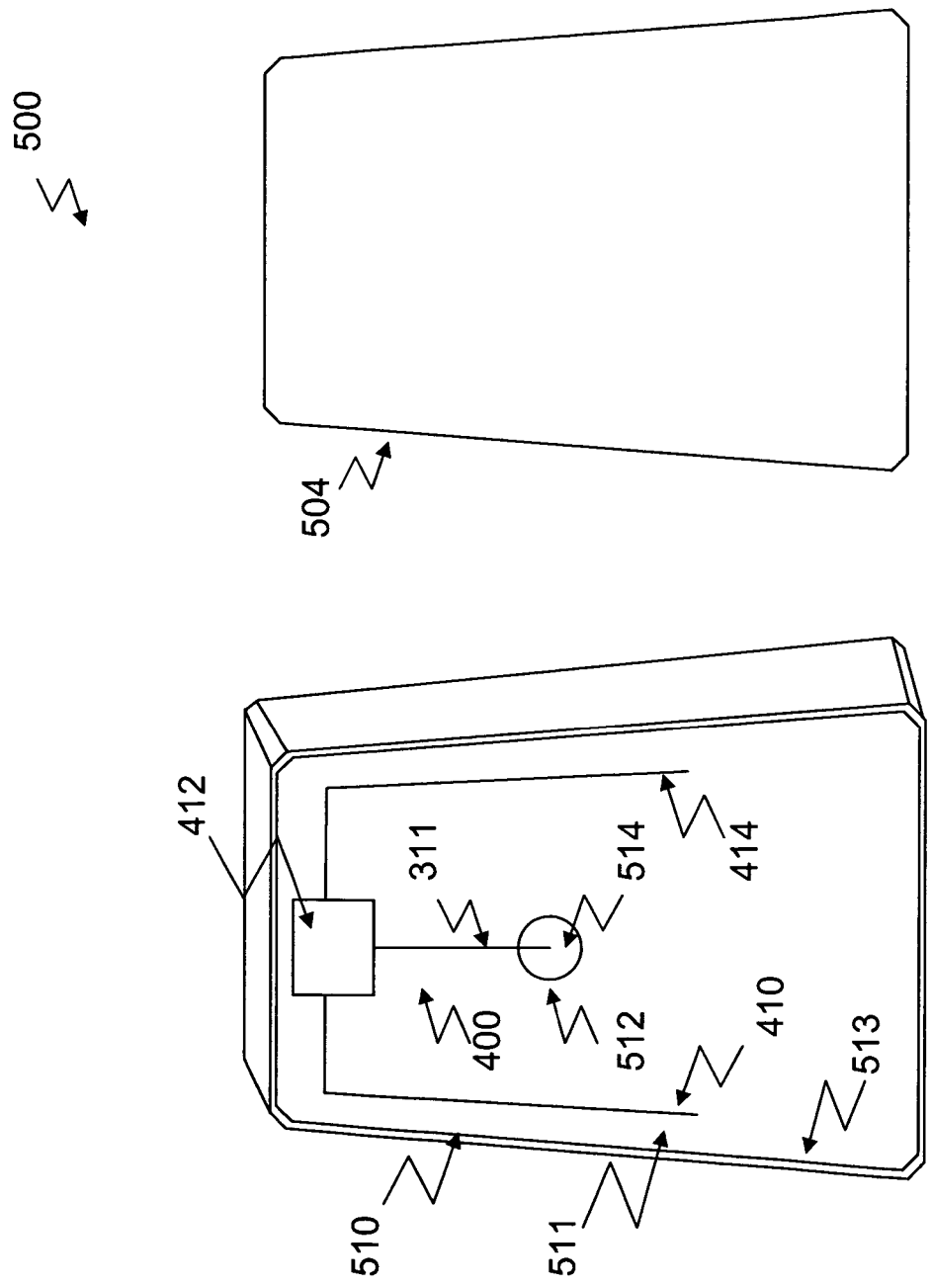
Fig. 5 An embodiment of a dipole antenna inside a handheld RFID reader

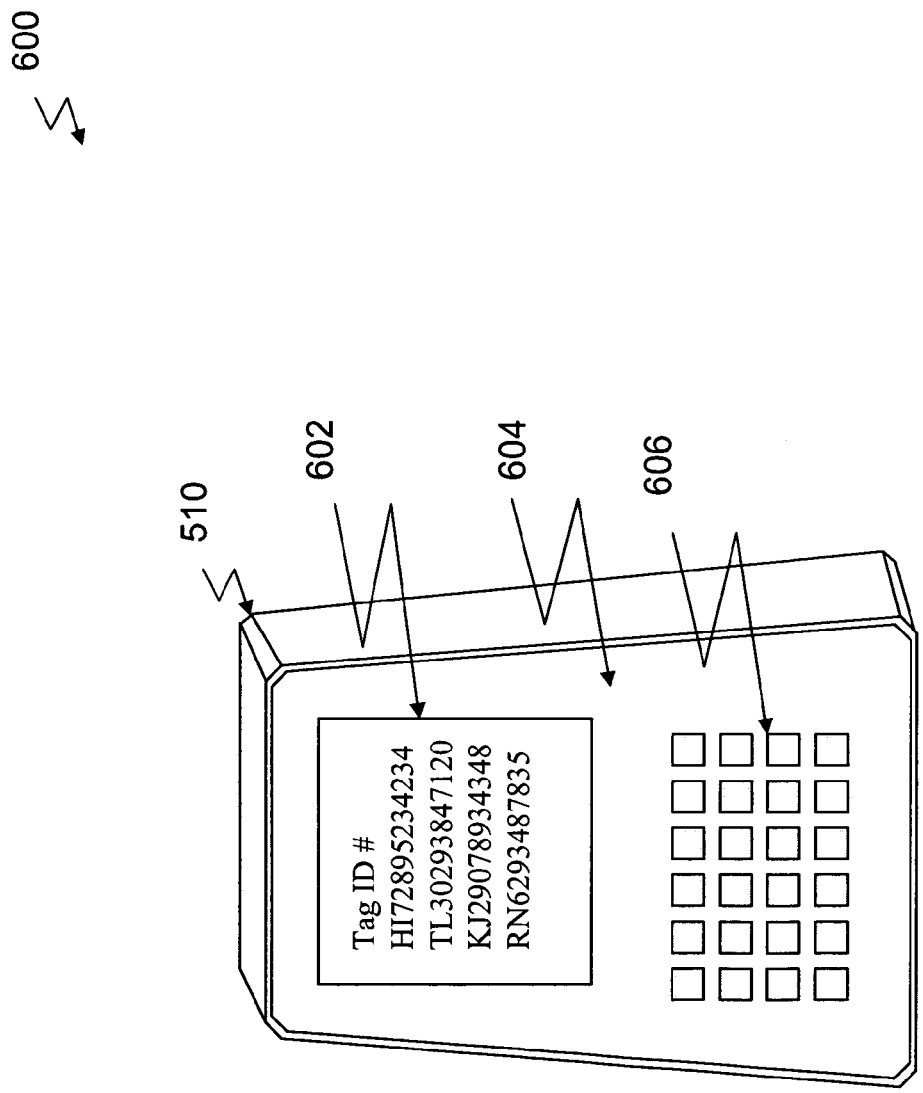
Fig. 6 An embodiment of a handheld RFID reader

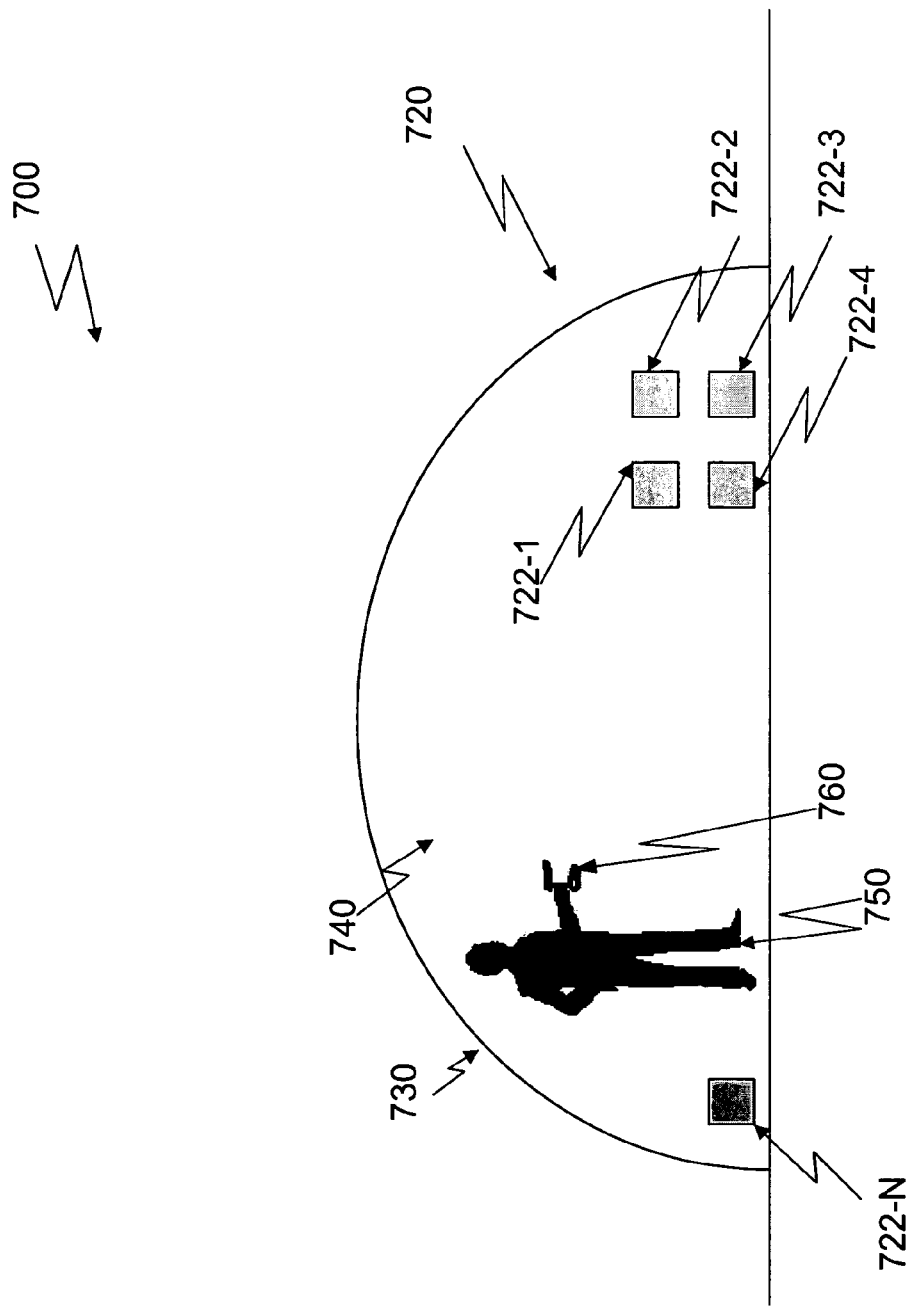
Fig. 7 An embodiment of an application of the handheld RFID reader

HAND HELD RFID READER WITH DIPOLE ANTENNA

GOVERNMENT LICENSE RIGHTS

The U.S. Government may have certain rights in the present invention as provided for by the terms of Contract No. N00174-01-D-0016 awarded by the Dept. of Navy.

TECHNICAL FIELD

The present invention relates generally to the field of contact-less identification such as Radio Frequency Identification (RFID) and, in particular, to hand held RFID readers.

BACKGROUND

Identification and tracking of tangible objects are essential in a multiplicity of industries. Automatic identification systems are replacing manual identification as automatic systems are more accurate, more efficient and more cost-effective. A key feature of automatic identification systems is remote or contact-less identification. Remote identification improves the accuracy of inventory identification, dramatically reduces the effort required, and allows potentially instant verification of inventory. Typical remote identification systems include Radio Frequency Identification (RFID) technology. Incorporating RFID technology reduces the time, cost and effort for performing identification and tracking when compared to manual methods while significantly improving the accuracy. RFID technology also provides a safer means for identification and tracking both in hazardous environments and identification and tracking of hazardous materials.

In general, a typical RFID systems consists of a transmitter (tag) and a receiver (reader). The tag can be either a passive identification device or an active identification device. A passive tag typically is powered by an external means. One embodiment powers the tag from the reader via a magnetic field generated by the reader. A typical active RFID tag contains its own battery for power. A tag is affixed to an object to be identified. The transmitter sends a radio frequency interrogation signal that activates the tag and the tag emits a signal that identifies the object to which it is attached. The reader could be able to distinguish the identification signals from a single tag or a group of RFID tags. RFID tag readers can be found in two manifestations: hand held readers and fixed readers. The selection of a fixed or handheld reader depends on the application in which it is used.

When designing a handheld reader, there are a multiplicity of factors that need to be taken into account. One of the paramount considerations is that the size, weight, and shape of the reader is manageable by a typical user without excessively compromising the functionality of the reader. A key area for size reduction is the antenna used by a handheld reader. The antenna is used to excite the tag in order to elicit a response that identifies the item to which the tag is attached. Unfortunately, reductions in antenna size also result in reductions in antenna efficiency. Antenna efficiency is a measure of the amount of signal power that an antenna radiates to its environment relative to the amount of power supplied to the antenna. It is desirable to keep antenna efficiency as high as possible as low antenna efficiency requires higher power transmitters and this directly reduces battery life in a handheld reader. Frequently, the antenna size is so small and antenna efficiency is so low that the performance of the handheld reader as measured by its usable range is inadequate for many applications.

For the reasons stated above and for other reasons stated below which will become apparent to those skilled in the art upon reading and understanding the present specification, there is a need in the art for a hand held RFID reader that provides better performance over existing RFID readers in a variety of environments.

SUMMARY

Embodiments of the present invention provide a hand held RFID reader with better performance over existing readers. In one embodiment, a hand held RFID reader is provided. The reader includes a housing having a perimeter around an inner edge. The reader also includes a full-sized dipole antenna including two antenna elements coupled by a balun transformer. The antenna has nearly a unity gain over a range of angles. The reader also includes a transceiver, coupled to the dipole antenna by a suitable cable, the transceiver adapted to send and receive signals. The reader further includes a processor for processing signals received at the antenna. The first and the second antenna segments of the dipole antenna are wrapped along the perimeter around the inner edge of the housing.

DRAWINGS

FIG. 1 is an illustration of one embodiment of an antenna gain pattern of a compact antenna.

FIG. 2 is an illustration of one embodiment of antenna gain pattern full sized dipole antenna.

FIG. 3 is a block diagram of one embodiment of a RFID reader system.

FIG. 4 is an illustration of one embodiment of a dipole antenna.

FIG. 5 is a perspective view of one embodiment of the back of a hand held RFID reader with the back cover removed and showing one embodiment of a full sized dipole antenna installed in the RFID reader.

FIG. 6 is a perspective view of one embodiment of the front of a hand held RFID reader.

FIG. 7 is an illustration of one embodiment of an environment where RFID readers are used.

DETAILED DESCRIPTION

In the following detailed description of the preferred embodiments, reference is made to accompanying drawings that form a part hereof, and in which is shown, by way of illustration, specific embodiments in which the invention may be practiced. These embodiments are described in sufficient detail to enable those skilled in the art to practice the invention. It is to be understood that other embodiments may be utilized and that logical, mechanical and electrical changes may be made without departing from the scope of the present invention. The following detailed description is, therefore, not to be taken in a limiting sense.

FIG. 1 is an illustration of the antenna gain pattern of a compact antenna that enables receiving signals by a hand held RFID reader, indicated generally at 100. As illustrated, the gain is sub-optimal in that the antenna gain never approaches unity. This indicates that the antenna does not efficiently receive or transmit signals. Low antenna efficiency can degrade battery life in portable devices such as an handheld RFID reader by requiring a higher power transmitter to achieve a radiated signal power equivalent to that produced by a lower power transmitter and a more efficient antenna. Also, low antenna gain impacts the apparent usable range of the receiver as some of the signal that reaches the antenna is lost and causes the receiver to be unable to detect weak signals. The overall result of this is lower performance in the handheld reader and the performance may become sufficiently impaired as to affect the usability of the handheld reader.

FIG. 2 is an illustration of the antenna gain pattern of a full-sized dipole antenna, indicated generally at 200 that enables receiving signals in a hand held RFID reader. Antenna gain pattern 200 indicates the antenna gain is nearly unity at a range of angles. This indicates that the antenna has a preferred orientation for optimum gain and is very efficient at receiving signal from those directions. In a typical RFID reader, the antenna is oriented so that the antenna "points" in the direction from which RFID tag signals are most likely to originate. This results in efficient radiation of transmitted signals and also results in best sensitivity of the reader when receiving signals from tags. Generally speaking, a full-sized antenna has higher gain than a compact antenna and results in improved performance of the RFID reader vis-à-vis a compact antenna.

FIG. 3 is a block diagram of one embodiment of a hand held RFID reader, indicated generally at 300. As illustrated, the hand held RFID reader in 300 comprises a housing 305, power source 307, antenna 310, a transceiver 312, an interface module 314, a processor 315, a bus 316, a memory 317, a display 318 and an input/output device 320. Power source 307 provides power required for the operation of the hand held RFID reader 300. In one embodiment, antenna 310 is coupled to transceiver 312 using a coaxial feed-line 311. Transceiver 312 both receives and generates the radio frequency signals from antenna 310. The interface module 314 facilitates the communication of signals between the transceiver 312 and other modules in the reader.

In one embodiment, display 318 and input/output device 320 are coupled to processor 315 and memory 317 through bus 316. Display 318 is used to display RFID tag identification information and sundry other information received from interface module 314. Input/Output device 320 could be used to select which programs stored in memory 317 to run in order to perform desired operations and could also allow the reader to be connected to outside devices via input/output device 320 for purposes such as loading new programs, offloading data from tags that have been read, and other tasks as desired. The programs accessed in memory 317 are processed in processor 315. Data may be entered at the input/output device 320 using a keypad, touch screen, or other type of data entry device.

In operation, dipole antenna 310 of the RFID reader 300 receives signals transmitted by RFID tags. The tag signals contain tag identification and other information. The tag signals received at dipole antenna 310 are received by transceiver 312. Transceiver 312 passes the data contained within the terminated RFID tag signal to interface module 314. Interface module 314 receives the data from the tags and presents this data to internal databus 316 where it is manipulated by processor 315. Processor 315 may translate the data to a format recognizable by display 318, prepare the data for input/output device 320, store the data in memory 317, or any admixture of the aforementioned processes. In one embodiment, display 318 displays a list of all the RFID tag information carried by the signals from the tag and received at the RFID reader. In another embodiment, RFID reader 300 creates a list of RFID tags that is has received after interrogating the RFID tags and then compares the received list of RFID tag identification to a pre-selected list of RFID tag information stored in memory 317 to check for the presence or absence of specific RFID tags.

FIG. 4 is an illustration of one embodiment of a dipole antenna assembly, indicated generally at 400. As illustrated, dipole antenna assembly 400 comprises a coaxial feed-line 311, a balun 412 and antenna wires 410 and 414. Antenna wires 410 and 414 receive signals from RFID tags and couples the signal to coaxial feedline 311. Coaxial feed-line 311 carries the signal to a transceiver located within the RFID reader. Balun 412 is a balanced-unbalanced transformer. Balun 412 enables coupling balanced antenna wires 410 and 414 to unbalanced coaxial cable 311. In one embodiment, antenna wires 410 and 414 are made of equal lengths. In a full-sized antenna, each of antenna wires 410 and 414 are very nearly equal in length and the length is governed by the frequency at which the antenna is designed to operate.

FIG. 5 is a perspective view of one embodiment of the dipole antenna installed inside a hand held RFID reader 500 with the back cover 504 removed. As illustrated, hand held RFID reader 500 includes a non-conductive hand held RFID reader housing 510, a separation 511 between antenna wire 410 and the inner edge 513 of the housing. An identical separation exists between antenna wire 514 and the inner edge 513 of the housing. The size of the separation 511 is not important. The coaxial cable 311 passes through an orifice 512 into an inner cavity 514. In one embodiment, the orifice is replaced with a connector that effectively connects the coaxial cable 311 to the inner cavity. In this illustration, the dipole antenna assembly 400 includes antenna wires 410 and 414, a balun 412, and a coaxial feed-line 311.

In one embodiment, antenna wires 410 and 414 are wrapped along a perimeter 511 of the inner edge 513 inside housing 510 of hand held RFID reader 500 to provide a compact design for hand held RFID reader 500. Placing of full sized dipole antenna assembly 400 in this manner inside hand held RFID reader 500 takes advantage of the antenna gain inherent in a full-sized antenna and enables better performance of hand held RFID reader 500. Antenna wires 410 and 414 are coupled to a balun 412 which in turn is coupled to a coaxial feed-line 311. Hand held RFID reader housing 510 includes an inner cavity 514 that contains the necessary components required for the operation of the RFID reader 500. In one embodiment, coaxial feed-line 311 enters into inner cavity 514 through an orifice 512 to connect with a transceiver located within inner cavity 514, balun 412 is mounted on housing 510. Other embodiments are possible. Back cover 504 attaches to the back of housing 510 and protects antenna assembly 400.

FIG. 6 is a perspective view of one embodiment of the front of a hand held RFID reader, indicated generally at 600. In this embodiment, the front view of hand held RFID reader 600 includes housing 510, display 602, key pad 604 and keys 606. Display 602 lists the RFID tag information captured by the hand RFID reader 600. Key pad 604 includes a number of individual keys 606 that may be used to operate the RFID reader and may also be used to enter data that is to be programmed into the RFID tag. Other embodiments are possible where the usage of the keypad and display vary from this illustrative example.

FIG. 7 is an illustration of one embodiment of an environment where handheld RFID readers are used, indicated generally at 700. In this illustrated, environment 700 includes building 720, a reflecting wall 730 forming an enclosure 740, a person 750 carrying a hand held RFID reader 760, RFID tags 722-1 through 722-N that are attached to objects. Transmitted RFID tag signals are received by hand held RFID reader 760 carried by person 750. The RFID tags transmit unique identification numbers and possibly additional information related to or derived from the object to which they are attached.

In operation, person 750 moves within enclosure 740 of building 720 to capture the transmitted RFID tag information using hand held RFID reader 760. In one embodiment, building 720 is an ammunition magazine with an igloo shaped structure. RFID tags 722-1 through 722-N are attached to ammunition containers which may or may not have metal casings. The RFID tags transmit signal and some of the transmitted signals are received directly at hand held RFID reader 760 whereas others are reflected by either the wall 730 or other objects which could be the items to which RFID tags 722-1 through 722-N within enclosure 740 of building 720 are attached.

Because of possible multiple reflections (multipath) of transmitted RF signals from both the tags 722-1 through 722-N and the handheld reader 760, the strength of the signal received by the handheld reader may be very weak. If a compact antenna were used in the handheld reader, the attendant reduction in antenna gain could cause these signals to be sufficiently weak as to prevent accurate reception and correct decoding. Because of the higher antenna gain of a full-sized dipole antenna, the handheld reader is capable of reading RF signals that are much weaker than could be read by a handheld reader with a compact antenna. Thus, the useful range of the handheld reader is increased and this increases the utility of the handheld reader.

What is claimed is:

1. A hand held Radio Frequency Identification (RFID) reader comprising:
    a housing having a perimeter around an inner edge;
    a full-sized dipole antenna including two antenna elements coupled by a balun transformer;
    a transceiver, coupled to the dipole antenna by a suitable cable, the transceiver adapted to send and receive signals;
    a processor;
    a memory;
    a display adapted to display a plurality of RFID tag information;
    wherein the display is coupled to the processor and the memory; and
    wherein the first and the second antenna segments of the dipole antenna are wrapped along the perimeter around the inner edge of the housing.

2. The hand held Radio Frequency Identification (RFID) reader of claim 1, further comprising an interface module coupled to the transceiver and adapted to communicate the plurality of RFID tag information to the display.

3. The hand held Radio Frequency Identification (RFID) reader of claim 1, wherein the elements of the full-sized dipole antenna are of equal lengths.

4. The hand held Radio Frequency Identification (RFID) reader of claim 1, wherein the antenna elements are coupled to a balun.

5. The hand held Radio Frequency Identification (RFID) reader of claim 4, wherein the balun is mounted onto the housing.

6. The hand held Radio Frequency Identification (RFID) reader of claim 1, farther comprising:
    a key pad adapted to program the hand held RFID reader.

7. A Radio Frequency Identification (RFID) system comprising:
    a plurality of RFID tags, wherein each of the RFID tags is adapted to transmit a RFID tag signal; and
    at least one hand held RFID reader adapted to receive the plurality of RFID tag signals,
    wherein the hand held RFID reader includes:
        a full-sized dipole antenna including two antenna elements coupled together at one end;
        a transceiver, coupled to the dipole antenna by a suitable cable, the transceiver adapted to send and receive signals;
        a processor;
        a memory;
        a display screen adapted to display a plurality of RFID tag information;
        wherein the display is coupled to the processor and the memory; and
        wherein the antenna elements of the dipole antenna are wrapped along the perimeter around the inner edge of the housing.

8. The system of claim 7, further comprising an interface module coupled to the transceiver and adapted to communicate the plurality of RFID tag information to the display.

9. The system of claim 7, wherein the two antenna elements of the dipole antenna are of equal lengths.

10. The system of claim 7, wherein the two antenna elements are coupled to a balun.

11. The system of claim 10, wherein the balun is mounted onto the housing.

12. The system of claim 7, wherein the hand held RFID reader further comprising:
    a keypad adapted to provide user input to the hand held RFID reader.

13. A method of identifying objects, the method comprising:
    transmitting RFID tag information;
    receiving RFID tag information using a hand held RFID reader, wherein the hand held RFID reader includes a dipole antenna including two antenna elements coupled together at one end, wherein the antenna elements are wrapped along the perimeter around the inner edge of a housing;
    processing the RFID tag information; and
    displaying the RFID tag information on a display of the hand held RFID reader.

14. A method of manufacturing a hand held RFID reader, the method comprising:
    forming a housing;
    wrapping a first and a second antenna segment of a dipole antenna along the perimeter around the inner edge of the housing;
    providing a transceiver adapted to send and receive signals;
    providing a processor;
    providing a memory; and
    providing a display adapted to display a plurality of RFID tag information.

15. The method of manufacturing of claim 14, further comprising:
    providing an interface module coupled to the transceiver and adapted to communicate the plurality of RFID tag information to the display.

16. A hand held Radio Frequency Identification (RFID) reader comprising:
    a housing having a perimeter around an inner edge;
    a full-sized dipole antenna including two antenna elements coupled by a balun transformer, wherein the antenna has nearly a unity gain over a range of angles;

a transceiver, coupled to the dipole antenna by a suitable cable, the transceiver adapted to send and receive signals;

a processor for processing signals received at the antenna; and wherein the first and the second antenna segments of the dipole antenna are wrapped along the perimeter around the inner edge of the housing.

* * * * *